(12) United States Patent
Mansour et al.

(10) Patent No.: US 11,864,213 B1
(45) Date of Patent: Jan. 2, 2024

(54) REDUCING WIRELESS DEVICE CAPABILITIES BASED ON USAGE

(71) Applicant: T-MOBILE INNOVATIONS LLC, Overland Park, KS (US)

(72) Inventors: Nagi A. Mansour, Arlington, VA (US); Akin Ozozlu, McLean, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 89 days.

(21) Appl. No.: 17/320,868

(22) Filed: May 14, 2021

(51) Int. Cl.
*H04W 72/51* (2023.01)
*H04W 72/53* (2023.01)

(52) U.S. Cl.
CPC .......... *H04W 72/53* (2023.01); *H04W 72/51* (2023.01)

(58) Field of Classification Search
CPC .................................................... H04W 72/04
See application file for complete search history.

(56) References Cited

U.S. PATENT DOCUMENTS

| | | | |
|---|---|---|---|
| 9,253,334 B1* | 2/2016 | Rai | H04M 15/8038 |
| 2018/0092028 A1* | 3/2018 | Miao | H04W 76/10 |
| 2019/0188781 A1* | 6/2019 | O'Brien | G06Q 30/0643 |
| 2019/0230499 A1 | 7/2019 | Sun et al. | |
| 2020/0053811 A1* | 2/2020 | Ang | H04L 5/0098 |
| 2022/0078735 A1* | 3/2022 | Saggar | H04B 7/0695 |
| 2022/0182876 A1* | 6/2022 | Lei | H04L 1/0007 |

\* cited by examiner

*Primary Examiner* — Michael T Vu
(74) *Attorney, Agent, or Firm* — Jones Robb, PLLC

(57) ABSTRACT

Reducing wireless device capabilities based on a usage of the wireless device. Regular wireless device (e.g. non-RedCap wireless devices) with periods of low usage are configured to adjust device capabilities to mimic those of RedCap wireless devices. The capabilities can be modified in real-time based on monitoring of usage, or based on patterns of usage, e.g. during time windows typical to low-usage.

16 Claims, 6 Drawing Sheets

REDUCING WIRELESS DEVICE CAPABILITIES BASED ON USAGE

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. As wireless technology continues to improve, various different iterations of radio access technologies (RATs) may be deployed within a single wireless network. Such heterogeneous wireless networks can include newer 5G and millimeter wave (mmWave) networks, as well as older legacy networks. The rollout of 5G in terms of services, subscriptions and availability of 5G-capable devices is outpacing that of 4G Long-Term Evolution (LTE). In addition, the momentum behind 5G is expected to continue to be strong in the coming years, with a forecast of 5G subscriptions reaching 3.5 billion in 2026.

The engine for driving 5G forward for fast growth and rapid adoption is its radio access technology, referred to as New Radio (NR). The flexibility and scalability of 5G NR makes it possible to introduce timely enhancements to address new use cases to help expand the 5G ecosystem and connect more and more devices to the network. One recent example is NR support for reduced capability (RedCap) devices. This work item has recently been approved in the 3GPP RAN plenary in December 2020 and the feature will be introduced in 3GPP Release 17. The introduction of reduced capability NR devices can facilitate the expansion of the NR device ecosystem to cater to the use cases that are not yet best served by current NR specifications. The use cases that motivate the specification work on NR RedCap include wearables (e.g. smart watches, wearable medical devices, AR/VR goggles, etc.), industrial wireless sensors, and video surveillance. However, there exist challenges to balance resource allocations between RedCap wireless devices and non-RedCap wireless devices (i.e. regular wireless devices).

OVERVIEW

Exemplary embodiments described herein include methods, systems, and processing nodes for allocating resources in a wireless network.

An exemplary method includes monitoring a usage of a wireless device operating in a wireless sector and, responsive to changes in the usage, adjusting a device capability of the wireless device.

Another exemplary method for allocating resources in a wireless network includes determining that a usage of a wireless device is below a threshold, and reducing a device capability of the wireless device.

Another exemplary method for allocating resources in a wireless network includes determining that a usage of a wireless device is below a threshold, and instructing the wireless device to reduce a device capability of the wireless device.

These exemplary operations described herein may be performed by a processing node within a system, such as a telecommunication system. For example, an exemplary system for allocating resources in a wireless network includes at least a processing node and a processor coupled to the processing node. The processing node can be configured to perform operations including any of the operations described herein in any combination.

For example, an exemplary processing node can be configured to perform operations including monitoring a usage of a wireless device operating in a wireless sector and, responsive to changes in the usage, adjusting a device capability of the wireless device.

Another exemplary processing node for allocating resources in a wireless network can be configured to perform operations including determining that a usage of a wireless device is below a threshold, and reducing a device capability of the wireless device.

Another exemplary processing node for allocating resources in a wireless network can be configured to perform operations including determining that a usage of a wireless device is below a threshold, and instructing the wireless device to reduce a device capability of the wireless device.

DETAILED DESCRIPTION

The following disclosure provides methods and systems for reducing wireless device capabilities based on a usage of the wireless device. Regular wireless device (e.g. non-RedCap wireless devices) often undergo periods of low usage, but are allocated a minimum amount of resources that may be greater than the low usage. Therefore, as described herein, device capabilities of such regular wireless devices are adjusted to mimic those of RedCap wireless devices. The capabilities can be modified in real-time based on monitoring of usage, or based on patterns of usage, e.g. during time windows typical to low-usage. A load of a serving access node (or sector deployed therefrom) can be a factor in determining when and how to adjust device capabilities.

Therefore, a method as described herein includes monitoring a usage of a wireless device operating in a wireless sector, and responsive to changes in the usage, adjusting a device capability of the wireless device. In an example embodiment, the device capability comprises a standard capability. The method further includes determining that the usage drops below a threshold usage, and reducing the device capability. The method further includes reducing the device capability to mimic a reduced capability (RedCap) wireless device. In an example embodiment, monitoring the usage comprises monitoring a throughput associated with the wireless device. It can further be determined that a load of the wireless sector meets a threshold as a condition prior to adjusting the device capability. This enables different sectors to adjust wireless device capabilities based on different load thresholds, thereby facilitating resource allocation.

In an example embodiment, the method further includes identifying time-based trends in the usage, and adjusting the device capability is based on the time-based trends. Further, adjusting the device capability comprises one or more of: adjusting a maximum bandwidth allocated to the wireless device, adjusting a quantity of reception branches of the wireless device, adjusting a maximum number of transmission layers for the wireless device, and adjusting a modulation and coding scheme (MCS) for the wireless device. Different combinations of these adjustments can be performed depending on an application requirement of the wireless device. Further, these adjustments can be performed iteratively depending on multiple thresholds of resource usage, and in a predefined order. Resources are allocated for the wireless device according to the adjusted device capabilities. Further, the wireless device can be instructed to transmit the adjusted device capability to the wireless network, e.g. to a serving access node, thereby enabling a revised resource allocation.

These and other embodiments are further described herein and with reference to FIGS. 1-6.

Figure 1:
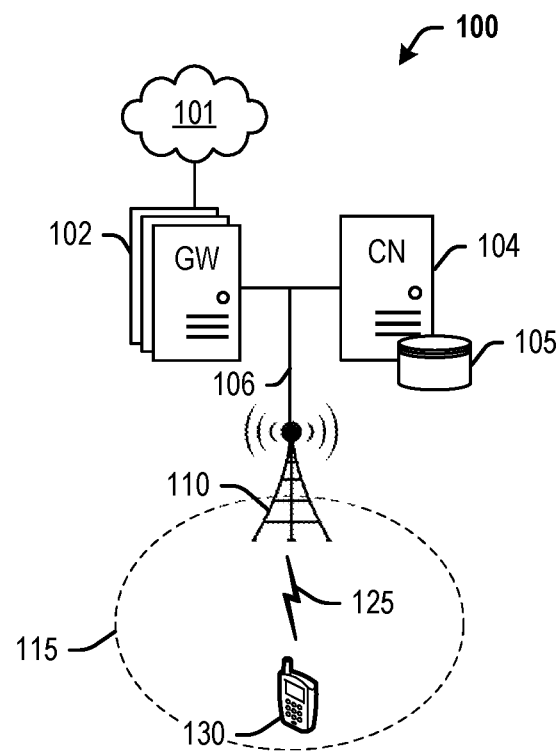
FIG. 1 depicts an exemplary system for reducing wireless device capabilities based on usage.

FIG. 1 depicts a system 100 comprising a communication network 101, gateway 102, controller node 104, access node 110, and wireless device 130. In this exemplary embodiment, access node 110 may be a macrocell access node configured to deploy one or more wireless air interfaces to which wireless device 130 can attach and access network services from network 101. For example, access node 110 can include an eNodeB, or a gNodeB, and is configured to deploy a wireless air interface one or more radio access technologies (RATs) such as 4G LTE and/or 5G NR. Each RAT can be configured to utilize a different frequency band or sub-band, a different channel size or bandwidth, and so on. For example, the 5G NR wireless air interface can be configured to utilize higher frequencies and larger channel bandwidths than the 4G LTE wireless air interface. Further, access node 110 can be configured to communicate using both RATs at the same time. For example, dual connections can be set up with wireless device 130 using both 4G and 5G wireless air interfaces, with the 4G wireless air interface being used to transmit control information, and the 5G wireless air interface being used to transmit data information. Although only access node 110 and wireless device 130 are illustrated in FIG. 1, system 100 can include various other combinations of carriers/wireless air interfaces, antenna elements, access nodes, and wireless devices, as may be evident to those having ordinary skill in the art in light of this disclosure.

In an exemplary embodiment, system 100 is further is configured to perform operations for resource allocation including monitoring a usage of wireless device 130 operating in wireless sector 115, and responsive to changes in the usage, adjusting a device capability of the wireless device 130. In an example embodiment, the device capability comprises a standard capability (i.e. wireless device 130 is a regular wireless device, not a RedCap wireless device). The method further includes determining that the usage drops below a threshold usage, and reducing the device capability. The method further includes reducing the device capability to mimic a reduced capability (RedCap) wireless device. In an example embodiment, monitoring the usage comprises monitoring a throughput associated with the wireless device 130 over wireless communication link 125. It can further be determined that a load of the wireless sector 115 (or access node 110) meets a threshold as a condition prior to adjusting the device capability. Adjusting the device capability comprises one or more of: adjusting a maximum bandwidth allocated to the wireless device 130 (over wireless communication link 125), adjusting a quantity of reception branches of the wireless device 130, adjusting a maximum number of transmission layers for the wireless device 130, and adjusting a modulation and coding scheme (MCS) for the wireless device 130. Adjusting the bandwidth can include reducing the bandwidth from 20 MHz to a lesser value. Adjusting the quantity of reception branches can include instructing the wireless device to activate or deactivate antennae, antenna elements, or portions of Rx and/or Tx antennae, thus configuring the wireless device to utilize fewer resources. Similarly, adjusting a maximum number of transmission layers reduced multiple-input-multiple-output (MIMO) overhead, especially when the usage is low. Adjusting the MCS can achieve a similar effect.

Different combinations of these adjustments can be performed depending on an application requirement of the wireless device 130. Further, these adjustments can be performed iteratively depending on multiple thresholds of resource usage, and in a predefined order. Access node 110 is configured to allocate resources for the wireless device 130 according to the adjusted device capabilities. For example, responsive to determining the reduced usage, the wireless device can be instructed to transmit adjusted device capabilities to access node 110.

Access node 110 can be any network node configured to provide communication between wireless device 130 and communication network 101, including standard access nodes such as a macro-cell access node, base transceiver station, a radio base station, an eNodeB device, an enhanced eNodeB device, a next generation NodeB device (gNodeB) in 5G networks, or the like. In an exemplary embodiment, a macro-cell access node can have a coverage area in the range of approximately five kilometers to thirty-five kilometers and an output power in the tens of watts. Alternatively, access node 110 may comprise any short range, low power, small-cell access node such as a microcell access node, a picocell access node, a femtocell access node, or a home eNodeB/gNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication link 106. Access node 110 may communicate with other access nodes (not shown), using a wireless link or a wired link such as an X2 link. Components of exemplary access node 110 are further described with reference to FIG. 2.

Wireless device 130 may be any device, system, combination of devices, or other such communication platform capable of communicating wirelessly with access node 110 using one or more frequency bands deployed therefrom. Wireless device 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless device 130. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication link 106 can use various communication media, such as air, space, metal, optical fiber, or some other signal propagation path—including combinations thereof. Communication link 106 can be wired or wireless and use various communication protocols such as Internet, Internet protocol (IP), local-area network (LAN), S1, optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Other wireless protocols can also be used. Communication link 106 can be direct links or might include various equipment, intermediate components, systems, and networks, such as a cell site router, etc. Communication link 106 may comprise many different signals sharing the same link. Communication link 106 may be associated with many different reference points, such as N1-Nxx, as well as S1-Sxx, etc.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW), a public data network gateway (PGW), and/or a systems architecture evolution gateway (SAE-GW) associated with 4G LTE networks, or a user plane function (UPF) associated with 5G NR networks. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a control gateway (SGW-C or PGW-C), a session management function (SMF), access and mobility function (AMF), a home subscriber server (HSS), a policy control and charging rules function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to components of system 100, such as antenna information/capabilities of wireless device 130, trends of usage over time, and so on. This information may be requested by or shared with access node 110 via communication link 106, X2 connections, and so on. The software comprises computer programs, firmware, or some other form of machine-readable instructions, and may include an operating system, utilities, drivers, network interfaces, applications, or some other type of software, and combinations thereof. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, gateway(s) 102, controller node 104, and/or network 101.

Figure 2:
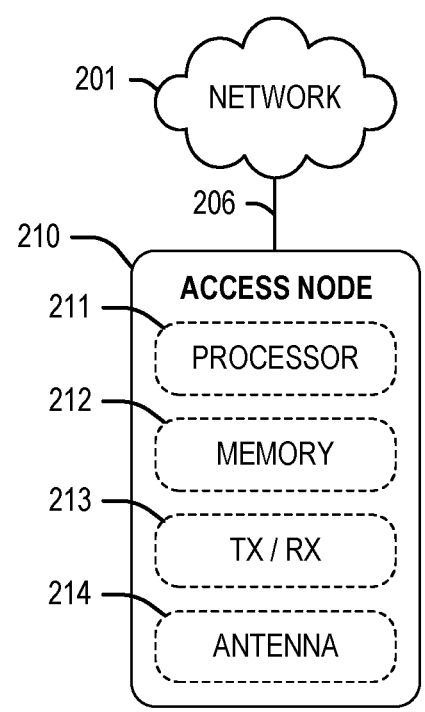
FIG. 2 depicts an exemplary access node for reducing wireless device capabilities based on usage.

FIG. 2 depicts an exemplary access node 210. Access node 210 may comprise, for example, a macro-cell access node, such as access node 110 described with reference to FIG. 1. Access node 210 is illustrated as comprising a processor 211, memory 212, a transceiver 213, and antennae 214 (hereinafter referred to as antenna elements 214). Processor 211 executes instructions stored on memory 212, and transceiver 213 (in conjunction with antenna elements 214) enable wireless communication respectively at least two wireless air interfaces, such as 4G LTE and 5G NR. For example, access node 210 may be configured to transmit control information using a first set of antennae elements 214 configured to utilize a 4G LTE interface, and data information using a second set of antennae elements 214 configured to utilize a 5G NR air interface. Alternatively or in addition, each separate air interface maintains its own control and data transmissions. Further, antenna elements 214 may include an array of antenna elements that are configured to deploy air interfaces over one or more wireless sectors, form beams within these sectors, employ multiple-input-multiple-output (MIMO), etc.

In an exemplary embodiment, memory 212 can store instructions for monitoring a usage of a wireless device operating in a wireless sector, and responsive to changes in the usage, adjusting a device capability of the wireless device. In an example embodiment, the device capability comprises a standard capability. The instructions can further include determining that the usage drops below a threshold usage, and reducing the device capability. The instructions can further include reducing the device capability to mimic a reduced capability (RedCap) wireless device. In an example embodiment, monitoring the usage comprises monitoring a throughput associated with the wireless device. It can further be determined that a load of the wireless sector meets a threshold as a condition prior to adjusting the device capability. The instructions can further include identifying time-based trends in the usage, and adjusting the device capability is based on the time-based trends. Further, adjusting the device capability comprises one or more of: adjusting a maximum bandwidth allocated to the wireless device, adjusting a quantity of reception branches of the wireless device, adjusting a maximum number of transmission layers for the wireless device, and adjusting a modulation and coding scheme (MCS) for the wireless device. Different combinations of these adjustments can be performed depending on an application requirement of the wireless device. Further, these adjustments can be performed iteratively depending on multiple thresholds of resource usage, and in a predefined order. Resources are allocated for the wireless device according to the adjusted device capabilities. Further, the wireless device can be instructed to transmit the adjusted device capability to the access node 210, thereby enabling a revised resource allocation.

Figure 3:
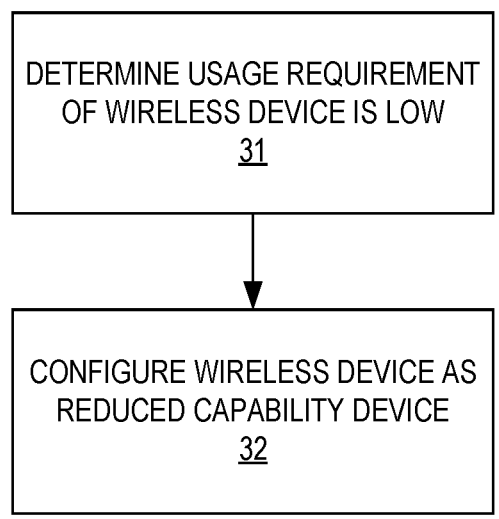
FIG. 3 depicts an exemplary method for reducing wireless device capabilities based on usage.

FIG. 3 depicts an exemplary method for resource allocation. The method of FIG. 3 may be implemented by a processing node communicatively coupled to one or more access nodes, controller nodes, or any other network node. Although FIG. 3 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 31, it is determined that a usage requirement of a wireless device is low, i.e. below a threshold, and at 32, the wireless device is configured as a reduced capability (RedCap) device. In an example embodiment, the device capability comprises a standard capability (i.e. wireless device is a regular wireless device, not a RedCap wireless device). In other words, the device capability is adjusted to mimic a reduced capability (RedCap) wireless device, such that reduced resources are allocated accordingly. In an example embodiment, monitoring the usage comprises monitoring a throughput associated with the wireless device. It can further be determined that a load of the wireless sector meets a threshold as a condition prior to adjusting the device capability. Adjusting the device capability comprises one or more of: adjusting a maximum bandwidth allocated to the wireless device, adjusting a quantity of reception branches of the wireless device, adjusting a maximum number of transmission layers for the wireless device, and adjusting a modulation and coding scheme (MCS) for the wireless device. Adjusting the bandwidth can include reducing the bandwidth from 20 MHz to a lesser value. Adjusting the quantity of reception branches can include instructing the wireless device to activate or deactivate antennae, antenna elements, or portions of Rx and/or Tx antennae, thus configuring the wireless device to utilize fewer resources. Similarly, adjusting a maximum number of transmission layers reduced multiple-input-multiple-output (MIMO) overhead, especially when the usage is low. Adjusting the MCS can achieve a similar effect.

Different combinations of these adjustments can be performed depending on an application requirement of the wireless device. Further, these adjustments can be performed iteratively depending on multiple thresholds of resource usage, and in a predefined order. The wireless network can allocate resources for the wireless device according to the adjusted device capabilities. For example, responsive to determining the reduced usage, the wireless device can be instructed to transmit adjusted device capabilities to a serving access node.

Figure 4:
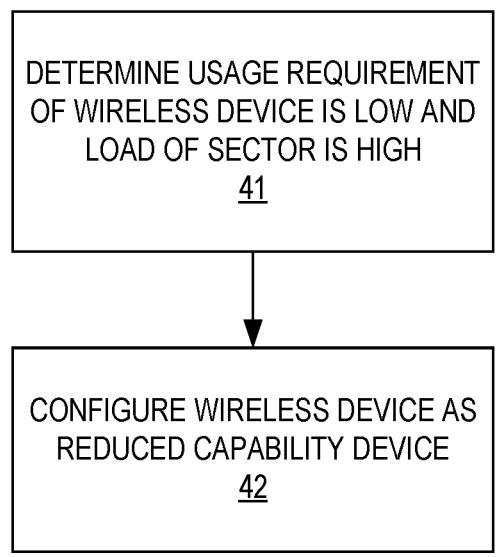
FIG. 4 depicts another exemplary method for reducing wireless device capabilities based on usage.

FIG. 4 depicts an exemplary method for resource allocation. The method of FIG. 4 may be implemented by a processing node communicatively coupled to one or more access nodes, controller nodes, or any other network node. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 41, it is determined that a usage requirement of a wireless device is low, i.e. below a threshold, and that a load of a sector serving the wireless device exceeds a threshold. Therefore, at 42, the wireless device is configured as a reduced capability (RedCap) device. In an example embodiment, the device capability comprises a standard capability (i.e. wireless device is a regular wireless device, not a RedCap wireless device). In other words, the device capability is adjusted to mimic a reduced capability (RedCap) wireless device, such that reduced resources are allocated accordingly. In an example embodiment, monitoring the usage comprises monitoring a throughput associated with the wireless device. It can further be determined that a load of the wireless sector meets a threshold as a condition prior to adjusting the device capability. Adjusting the device capability comprises one or more of: adjusting a maximum bandwidth allocated to the wireless device, adjusting a quantity of reception branches of the wireless device, adjusting a maximum number of transmission layers for the wireless device, and adjusting a modulation and coding scheme (MCS) for the wireless device. Adjusting the bandwidth can include reducing the bandwidth from 20 MHz to a lesser value. Adjusting the quantity of reception branches can include instructing the wireless device to activate or deactivate antennae, antenna elements, or portions of Rx and/or Tx antennae, thus configuring the wireless device to utilize fewer resources. Similarly, adjusting a maximum number of transmission layers reduced multiple-input-multiple-output (MIMO) overhead, especially when the usage is low. Adjusting the MCS can achieve a similar effect.

Different combinations of these adjustments can be performed depending on an application requirement of the wireless device. Further, these adjustments can be performed iteratively depending on multiple thresholds of resource usage, and in a predefined order. The wireless network can allocate resources for the wireless device according to the adjusted device capabilities. For example, responsive to determining the reduced usage, the wireless device can be instructed to transmit adjusted device capabilities to a serving access node. Therefore, when the load of the access node is within the threshold, the access node need not adjust the device capabilities regardless of the usage.

Figure 5:
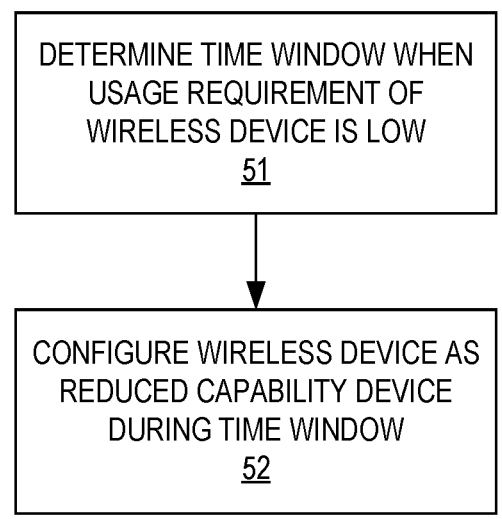
FIG. 5 depicts another exemplary method for reducing wireless device capabilities based on usage.

FIG. 5 depicts an exemplary method for resource allocation. The method of FIG. 5 may be implemented by a processing node communicatively coupled to one or more access nodes, controller nodes, or any other network node. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 51, a time window is determined during which a usage requirement of a wireless device is low, and at 52, the wireless device is configured as a reduced capability (RedCap) device during subsequent similar time windows. In an example embodiment, the device capability comprises a standard capability (i.e. wireless device is a regular wireless device, not a RedCap wireless device). In other words, the device capability is adjusted to mimic a reduced capability (RedCap) wireless device, such that reduced resources are allocated accordingly during the time windows in which the usage is predicted to be low (based on previous trends identified in 51). In an example embodiment, determining the time window comprises monitoring a throughput associated with the wireless device, as well as a load of the wireless sector, to determine how and when to adjust the device capability. Further, configuring the wireless device as a reduced capability device can include adjusting a maximum bandwidth allocated to the wireless device, adjusting a quantity of reception branches of the wireless device, adjusting a maximum number of transmission layers for the wireless device, and adjusting a modulation and coding scheme (MCS) for the wireless device, as described herein.

Figure 6:
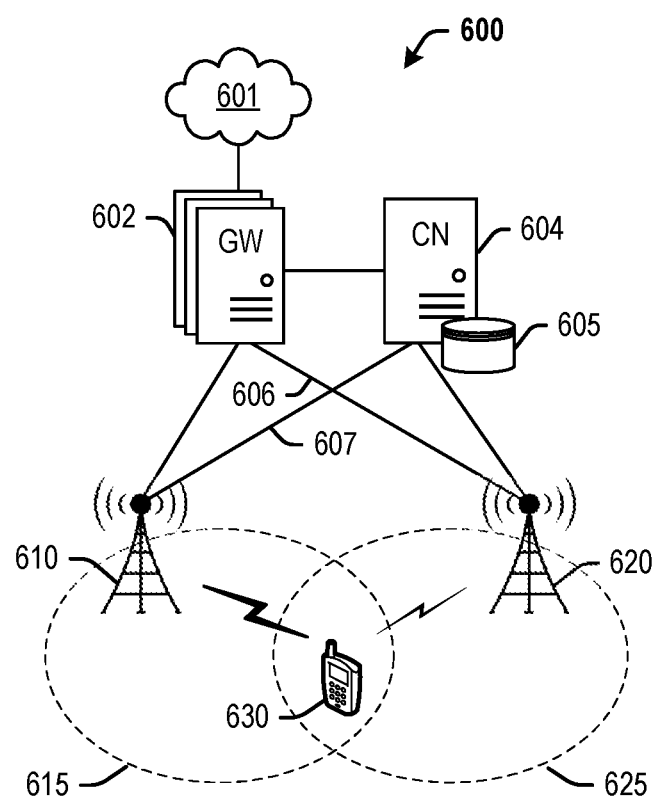
FIG. 6 depicts another exemplary system for reducing wireless device capabilities based on usage.

FIG. 6 illustrates another system 600 for allocating resources. System 600 is similar to system 100, in that it includes access node 610, gateway 602, controller node 604, network 601, and wireless device 630. However, system 600 include another access node 620, such that wireless device 630 is located within range of sector 615 deployed by access node 610 and sector 625 deployed by access node 620. In this exemplary embodiment, access nodes 610, 620 may be macrocell access nodes configured to deploy one or more wireless air interfaces to which wireless device 630 can attach and access network services from network 601. For example, access nodes 610, 620 can include an eNodeB, or a gNodeB. Further, system 600 is further is configured to perform operations for resource allocation including monitoring a usage of wireless device 630 operating in one (or both) wireless sector 615, 625, and responsive to changes in the usage, adjusting a device capability of the wireless device 630. In an example embodiment, the device capability comprises a standard capability (i.e. wireless device 630 is a regular wireless device, not a RedCap wireless device). The method further includes determining that the usage drops below a threshold usage, and reducing the device capability. The method further includes reducing the device capability to mimic a reduced capability (RedCap) wireless device. Further in this embodiment, a load of one or both of access nodes 610, 620 is determined as meeting a threshold as a condition prior to adjusting the device capability. Thus, for example, while wireless device 630 has a low usage, a load of access node 610 is not higher than a threshold and, therefore, wireless device 630 is configured to transmit regular device capabilities to access node 610 and receive resource allocations accordingly. Whereas, a load of access node 620 may exceed a threshold, and therefore, wireless device 630 is configured to transmit adjusted device capabilities to access node 620 (i.e. mimicking a RedCap device), such that access node 620 performs resource allocations based on the adjusted device capabilities.

While 4G LTE and 5G NR are described in the above embodiments, the disclosed operations may apply to different combinations of radio air interfaces, including any combination of radio air interfaces within the same or different radio-access technologies, such as multiple different 4G carriers with different bandwidths, 5G carriers with different bandwidths, or any future wireless technology. So long as the described adjustment of device capabilities based on resource usage is performed as described herein, the specific implementation and network topology is less relevant.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for allocating resources in a wireless network, the method comprising:
   monitoring a first throughput associated with a non-Reduced Capability (RedCap) wireless device operating in a wireless sector;
   determining that the first throughput drops below a threshold throughput; and
   in response to the drop in the first throughput, reducing a device capability of the wireless device to mimic a RedCap wireless device,
   wherein reducing the device capability consists of adjusting a maximum bandwidth allocated to the wireless device, adjusting a quantity of reception branches of the wireless device, adjusting a maximum number of transmission layers for the wireless device, and adjusting a modulation and coding scheme (MCS) for the wireless device, and wherein the adjustments can be performed iteratively depending on multiple thresholds of resource usage.

2. The method of claim 1, wherein the device capability comprises a standard capability prior to reducing the device capability.

3. The method of claim 1, further comprising determining that a load of the wireless sector meets a threshold as a condition prior to reducing the device capability.

4. The method of claim 1, further comprising identifying time-based trends in throughput, wherein the device capability is reduced based on the time-based trends.

5. The method of claim 1, wherein resources are allocated for the wireless device according to the device capability.

6. The method of claim 1, further comprising instructing the wireless device to transmit the device capability to the wireless network.

7. The system of claim 6, wherein the operations further comprise determining that a load of the wireless sector meets a threshold as a condition prior to adjusting reducing the device capability.

8. A system for allocating resources, the system comprising:
   a processing node; and
   a processor coupled to the processing node, the processor being configured to perform operations comprising:
   determining that a first usage of a non-Reduced Capability (RedCap) wireless device is below a threshold usage; and
   in response to the determining, reducing a device capability of the wireless device to mimic a RedCap wireless device,
   wherein reducing the device capability to mimic a RedCap wireless device consists of adjusting a maximum bandwidth allocated to the wireless device, adjusting a quantity of reception branches of the wireless device, adjusting a maximum number of transmission layers for the wireless device, and adjusting a modulation and coding scheme (MCS) for the wireless device, and wherein the adjustments can be performed iteratively depending on multiple thresholds of resource usage.

9. The system of claim 8, wherein resources are allocated for the wireless device according to the reduced device capability.

10. The system of claim 8, wherein the first usage comprises a throughput.

11. The system of claim 10, wherein the operations further comprise identifying time-based trends in throughput, wherein the device capability is adjusted based on the time-based trends.

12. A processing node for allocating resources, the processing node being configured to perform operations comprising:
   determining that a first usage requirement of a non-Reduced Capability (RedCap) wireless device is below a threshold usage; and
   in response to the determining, instructing the wireless device to reduce a device capability of the wireless device to mimic a RedCap wireless device,
   wherein instructing the wireless device to reduce the device capability to mimic a RedCap wireless device consists of adjusting a maximum bandwidth allocated to the wireless device, adjusting a quantity of reception branches of the wireless device, adjusting a maximum number of transmission layers for the wireless device, and adjusting a modulation and coding scheme (MCS) for the wireless device, and wherein the adjustments can be performed iteratively depending on multiple thresholds of resource usage.

13. The processing node of claim 12, wherein resources are allocated for the wireless device according to the device capability.

14. The processing node of claim 12, wherein the first usage requirement comprises a throughput.

15. The processing node of claim 12, wherein the first usage requirement comprises a throughput requirement.

16. The processing node of claim 12, wherein instructing the wireless device to reduce the device capability comprises instructing the wireless device to reduce the device capability to mimic a RedCap wireless device.

* * * * *